United States Patent
Oxenfarth

(10) Patent No.: US 8,007,612 B2
(45) Date of Patent: Aug. 30, 2011

(54) METHOD AND DEVICE FOR POSITION-COMPENSATED AND ANGLE-COMPENSATED WELDING

(76) Inventor: Hans Oxenfarth, Ennepetal (DE)

( * ) Notice: Subject to any disclaimer, the term of this patent is extended or adjusted under 35 U.S.C. 154(b) by 620 days.

(21) Appl. No.: 11/991,828

(22) PCT Filed: Feb. 28, 2007

(86) PCT No.: PCT/EP2007/001699
§ 371 (c)(1),
(2), (4) Date: Mar. 11, 2008

(87) PCT Pub. No.: WO2007/107225
PCT Pub. Date: Sep. 27, 2007

(65) Prior Publication Data
US 2008/0185088 A1 Aug. 7, 2008

(30) Foreign Application Priority Data
Mar. 17, 2006 (EP) ..................... 06005467

(51) Int. Cl.
*B32B 41/00* (2006.01)
(52) U.S. Cl. ............ 156/64; 156/359; 156/378
(58) Field of Classification Search ............ 156/64, 156/359, 378; 700/119, 120, 207, 212
See application file for complete search history.

(56) References Cited

U.S. PATENT DOCUMENTS

| | | | |
|---|---|---|---|
| 6,096,132 A * | 8/2000 | Kaiba et al. | 118/680 |
| 6,491,786 B2 | 12/2002 | Moench | |
| 2002/0062161 A1 | 5/2002 | Dusterhoft | |
| 2004/0060639 A1 * | 4/2004 | White | 156/73.1 |
| 2006/0282192 A1 * | 12/2006 | Beehag | 700/206 |

FOREIGN PATENT DOCUMENTS

| | | |
|---|---|---|
| EP | 1 110 702 | 6/2001 |
| JP | 2003-011229 | 1/2003 |

OTHER PUBLICATIONS

International Search Report for PCT/EP2007/001699, Feb. 7, 2007.

* cited by examiner

*Primary Examiner* — George R Koch, III
(74) *Attorney, Agent, or Firm* — Collard & Roe, P.C.

(57) ABSTRACT

The invention relates to a method for the position- and angle-compensated welding of a component (6) to a base body (5), in particular to a blow molding, comprising the working steps of three-dimensionally recording the geometrical and positional data of the joining face (51) of the base body (5), positioning at least one heating element (221) on the basis of the recorded geometrical and positional data in such a way that a constant distance between the heating element (221) and the joining face (51) of the base body (5) is achieved over the entire joining face (51), plastifying the joining faces (51, 61) of the base element (5) and the component (6) and bringing the plastified joining faces (51, 61) of the component (6) and the base body (5) together. The invention also relates to a device for carrying out the method for the position- and angle-compensated welding of a component (6) to a base body (5), comprising at least one heating element (221) and means for positioning (2) the at least one heating element (221), means (3) for positioning the base body (5), means for positioning the component, means (23) for recording geometrical and positional data of a body (5) and also a control unit (4), wherein the means (2) for positioning the at least one heating element (221), the means (3) for positioning the base body (5) and the means (2) for positioning the component (6) act together under the control of the control unit (4) in such a way that a uniform distance between the at least one heating element (221) and the joining face (51) of the base body (5) can be achieved over the entire joining face (51) on the basis of the geometrical and positional data.

12 Claims, 2 Drawing Sheets

METHOD AND DEVICE FOR POSITION-COMPENSATED AND ANGLE-COMPENSATED WELDING

CROSS REFERENCE TO RELATED APPLICATIONS

Figure 1:
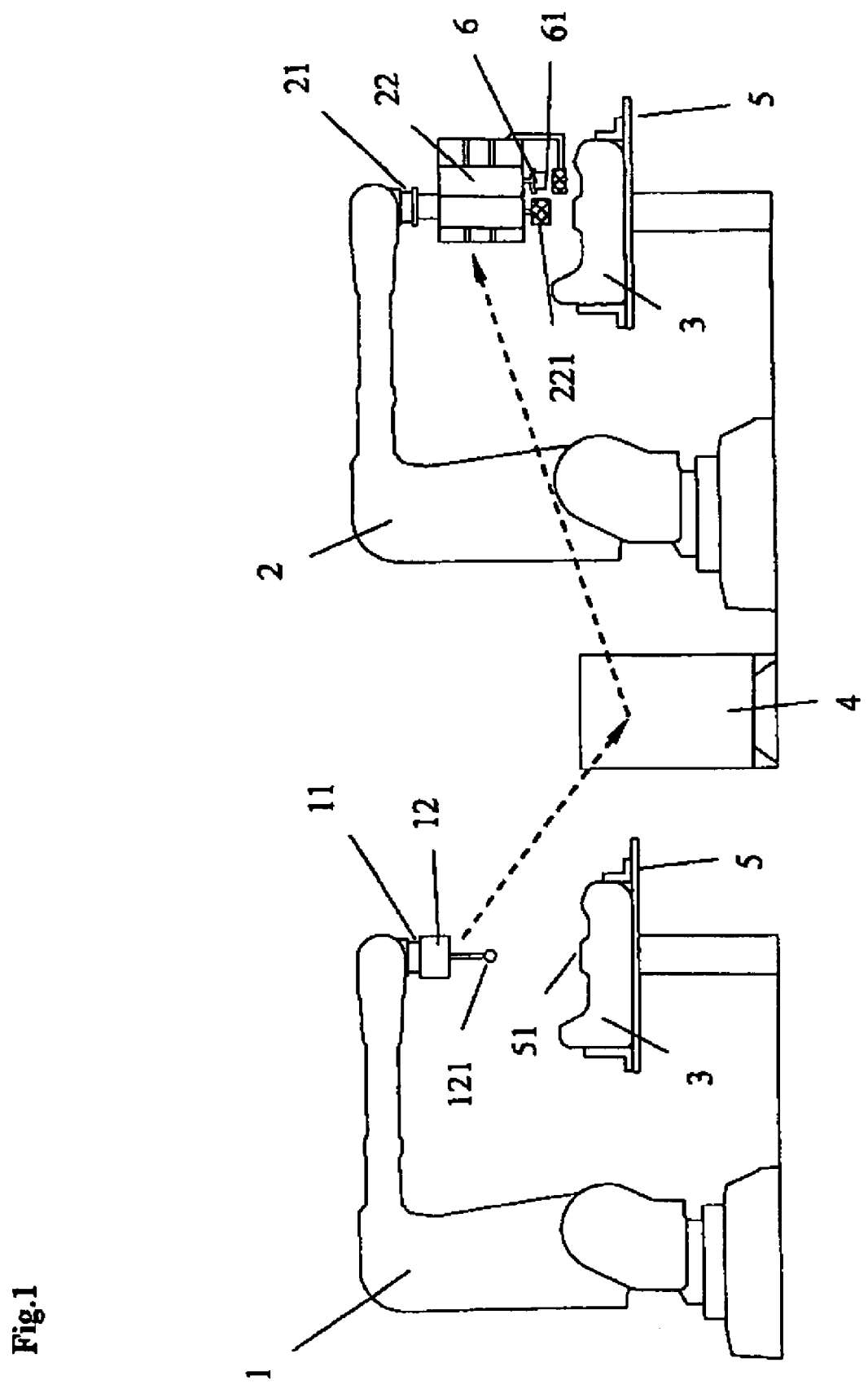

Applicant claims priority under 35 U.S.C. §119 of European Application No. 06005467.3 filed Mar. 17, 2006. Applicant also claims priority under 35 U.S.C. §365 of PCT/EP2007/001699 filed Feb. 28, 2007. The international application under PCT article 21(2) was not published in English.

The invention relates to a method and a device for position-compensated and angle-compensated welding of a component to a base body, particularly to a blow-molded body.

Application parts such as filling connectors, aeration and venting valves, or attachment elements are attached to extrusion-blown hollow bodies such as fuel tanks, for example, by means of different welding methods. In most cases, hot-element welding is used.

In the case of the hot-element welding method, the connection surfaces of the components to be welded are plasticized using a heating element, directly (contact heating) or indirectly (radiation heating), and welded to one another under pressure. In this connection, the welding process breaks down into the essential method steps of initial heating (plastification of the joining surface), re-setting (removing the heating element from the work area), and joining (welding of the plasticized joining surfaces under contact pressure).

In the plurality of application cases, the direct welding method (contact heating) is used. In the case of this method, the joining surfaces have direct contact with the heating element. The components to be welded to one another should consist of the same type of plastic, if possible; welding of different plastics is also possible under certain conditions. Depending on the type of plastic, it can happen that the melt "sticks" to the heating element. In these cases, it is practical to provide the heating elements with anti-adhesion coatings.

Particularly in the case of welding of plastics whose melt sticks to the heating element despite an anti-adhesion coating, or requires a higher heating temperature (<270° C.) than the anti-adhesion coating permits, contact-free methods are used. In this connection, the joining surfaces of the components to be welded are plasticized in that a distance of approximately 0.5 to 1.0 mm remains between joining surface and heating element. In this case, the heating element temperature amounts to approximately 400° C. to 600° C., depending on the plastic being used. In order to achieve uniform plastification of the joining surfaces, it is necessary for the distance between joining surface and heating element to be the same over the entire welding surface. Accordingly, this method is only suitable for plastics that can be produced within a narrow tolerance range.

To balance out uneven areas and tolerances of the joining surfaces, these can be pressed against the heating element at a defined force for as long as required to allow the entire surface to lie against it in plane-parallel manner. Accordingly, the equalization path must be greater than the sum of the tolerances of the joining surface and of the heating element. When the heating path is reached by means of reaching mechanical contact, or after the expiration of a set equalization time, the equalization process is concluded. At the same time, the heating force is reduced, so that no plasticized material is displaced out of the joining zone any longer. However, the possibility of an equalization process is limited by the material thickness of the body to be welded. Particularly in the case of extrusion-blown hollow bodies such as fuel tanks, there is a very low material thickness, and this makes the use of equalization processes difficult.

Another set of problems is due to greater angle deviations between the joining surfaces of the components to be welded to one another. Welding systems having static welding part accommodations and heating elements cannot adapt to the angle position of the joining surfaces during every welding process, and accordingly can be used only where no greater angle deviations of the joining surfaces are to be expected. Welding systems having self-adjusting welding part accommodations and heating elements were developed, which adapt by means of a special spherical mounting, without significant offset of the x/y coordinates of the joining surface of the joining partner.

Independent of the heating element used, a different position of the welding surface has to be expected for every article, on the basis of the great tolerance variations, particularly in the case of hollow bodies. Welding systems having a static path limitation prove to be unsuitable here. This results from the fact that in one case, too much material is plasticized, and in another, too little material is plasticized. Similar problems occur also in the case of welding systems controlled exclusively by pressure, since the forces resulting from the different spring effect of the container wall in the welding region, and thus the plastification distribution, can be different with every welding process.

This is where the invention wants to provide a remedy. The invention is based on the task of creating a method for position-compensated and angle-compensated welding, which allows uniform plastification of the joining surfaces, even in the case of great position and angle tolerances of the joining surfaces to be welded. According to the invention, this task is accomplished by means of the characteristics of claim 1.

A method for position-compensated and angle-compensated welding is created with the invention, which method allows uniform plastification of the joining surfaces even in the case of great position and angle tolerances of the joining surfaces to be welded.

The term "heating element" is used here to represent all suitable means for plastification of the joining surfaces, for example also those means that are used in back-welding or ultrasound welding. Such means are thus subsumed in the term "heating element" in the sense of the invention.

In a further development of the invention, the detection of the geometry data and position data takes place by means of contact-free scanning. In this way, real-time and wear-free detection of the geometry data and position data is made possible.

In an embodiment of the invention, the geometry data and position data of the entire base body and its joining surfaces are measured. In this way, only one detection of the geometry data and position data is required for one and the same base body, even if multiple welding passes are required. Furthermore, the measurement data can be used within the framework of quality assurance of the underlying base body.

Preferably, a three-dimensional detection of the geometry data and position data of the joining surface of the component takes place, in addition, in such a manner that the same distance between heating element and joining surface of the component is achieved over the joining surface. In this way, optimal conveyance of the joining surface of the component to the joining surface of the base body is made possible.

Preferably, positioning of the component relative to the at least one heating element takes place on the basis of the geometry data and position data detected. In this way, a uniform melt layer is achieved on the joining surface of the component.

In a further embodiment of the invention, additional processing steps are carried out on the base body on the basis of the geometry data and position data detected. In this way, conveyance of processing tools that is correct in terms of position and angle is made possible. This particularly relates to those processing operations that require parallel orientation of the processing surface, such as making openings (cutting, milling, etc.) in the base body, or labeling it by means of a laser.

The present invention is furthermore based on the task of making available a device for position-compensated and angle-compensated welding that allows uniform plastification of the joining surfaces even in the case of great tolerance variations of the joining surfaces to be welded. According to the invention, this task is accomplished by means of the characteristics of claim 7.

A device for position-compensated and angle-compensated welding is created with the invention, which allows uniform plastification of the joining surfaces even in the case of great tolerance variations of the joining surfaces to be welded.

In a further development of the invention, the means for positioning the base body and the means for positioning the component work together, controlled by the control unit, in such a manner that when base body and component are joined together, a contact pressure that is uniform over the joining surfaces can be achieved on the basis of the geometry data and position data. In this way, a high-quality welded connection is guaranteed even in the case of hollow bodies having thin, resilient walls.

In an embodiment of the invention, at least one means for positioning the heating element is a multi-axis robot. In this way, a high throughput of welding cycles is made possible, in connection with great process accuracy.

It is advantageous if the means for detecting geometry data and position data is a laser-supported 3D scanner. In this way, fast and wear-free detection of the geometry data and position data is made possible. Alternatively, however, other 3D measurement systems can also be used.

Preferably, additional means for processing the base body are provided, which can be controlled by way of the control unit, on the basis of the geometry data and position data detected. In this way, real-time processing of the base body, including processing of the joining surface, is made possible.

In a further embodiment, heating elements and the means for detecting geometry data and position data are combined in one handling unit. In this way, a speedy course of the process is made possible.

Figure 2:
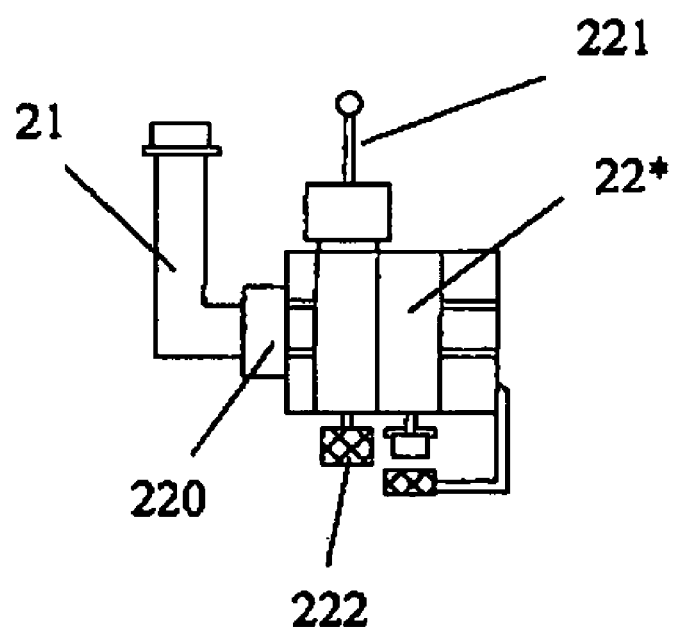

Other further developments and embodiments of the invention are indicated in the remaining dependent claims. An exemplary embodiment of the invention is shown in the drawing and will be explained in detail below. The drawings show:

FIG. 1 A schematic representation of a device for position-compensated and angle-compensated welding, and FIG. 2 a schematic representation of a combined handling unit.

The device for heating element welding selected as an exemplary embodiment essentially comprises two robots 1, 2, a work piece carrier 3, and a control unit 4. Instead of the robots 1, 2, other controllable positioning systems can also be used. The robot 1 is equipped with a tool changing system 11 for accommodating an effector unit 12. The effector unit 12 is provided with a laser distance measurement device 121.

The robot 2 is also equipped with a tool changing system 21, which accommodates an effector unit 22. The effector unit 22 is provided with a heating element 221 and an accommodation for a component 6 to be fixed in place.

The robots 1, 2 are connected with a common control unit 4. To weld a component 6 to a base body 5, the base body 5 is first fixed in place on a work piece accommodation 3. Subsequently, three-dimensional detection of the geometry data and position data of the joining surface 51 of the base body 5 takes place by means of the laser distance measurement device 121. In this connection, the effector 12 is guided over the base body 5 by means of the robot 1, controlled by the control unit 4. The geometry data and position data detected are transmitted to the control unit 4. (The data flow is shown in FIG. 1 by means of broken-line arrows.) Based on the geometry data and position data of the joining surface 51 of the base body 5, the robot 2 is controlled by the control unit 4 in such a manner that the effector unit 22, with the heating element 221 disposed on it, is positioned at a defined distance in front of the joining surface 51 of the base body 5. Positioning of the heating element 221 takes place on the basis of the geometry data and position data detected, in such a manner that the distance between heating element 221 and joining surface 51 of the base body 5 is the same over the entire joining surface 51. At the same time, heating of the joining surface 61 of the component 6 takes place by way of another heating element, not shown. After the joining surfaces 51, 61 of base element 5 and component 6 have been heated, the effector unit 22 is moved out of the work area by way of the robot 2. Subsequently, the component 6 is positioned on the base body 5, after a tool change by means of the effector unit 22*, in such a manner that the joining surfaces 51, 61 of base body 5 and component 6 lie precisely on one another and have a uniform contact pressure applied to them over the entire joining surface 51, 61.

In an advantageous embodiment according to FIG. 2, a combined effector unit 22* is used. The combined effector unit 22* is connected with the tool changing system 21 of the robot 2 by way of an intermediate piece 220 that can rotate. The effector unit 22* is equipped with both a 3D measurement system 222 and a heating element 221, so that no tool change has to take place between the process steps of detection of the geometry data and position data of the joining surface of the base body, and heating of the joining surface of the base element. In the exemplary embodiment, a laser distance measurement device is used within the 3D measurement system. Alternatively, the use of a different contact-free system (ultrasound measurement, for example) or even a tactile measurement system, is also possible. The aforementioned process steps can be carried out with only one robot 2 by means of the effector unit 22*.

Furthermore, an effector having a processing tool, for example a circular cutter, can be provided, in order to undertake processing of the base body 5 on the basis of the geometry data and position data detected. Such processing can consist, for example, of making a (circular) opening in a fuel tank configured as a blow-molded body, before welding on a filling connector. It is also possible to provide the processing tool in the combined effector unit according to FIG. 2, as well.

The invention claimed is:

1. Method for position-compensated and angle-compensated welding of a component having a joining surface to a base body having at least one joining surface, particularly to a blow-molded body, comprising the following work steps:

three-dimensional detection of the geometry data and position data of the joining surface of the base body to be welded, positioning of at least one heating element on the basis of the geometry data and position data detected, in such a manner that the same distance between the at least one heating element and the joining surface of the base body is achieved over the entire joining surface, plastification of the joining surfaces of the base body and the component, bringing together of the plasticized joining surfaces of the component and the base body.

2. Method according to claim 1, wherein the detection of the geometry data and position data takes place by means of contact-free scanning.

3. Method according to claim 1, wherein the geometry data and position data of the entire base body and its joining surfaces are measured.

4. Method according to claim 1, wherein in addition, three-dimensional detection of the geometry data and position data of the joining surface of the component takes place.

5. Method according to claim 4, wherein positioning of the component takes place relative to at least one heating element, on the basis of geometry data and position data detected, in such a manner that the same distance between heating element and joining surface of the component is achieved over the joining surface.

6. Method according to claim 1, wherein additional processing steps are carried out on the base body, on the basis of the geometry data and position data detected.

7. Device for carrying out a method according to claim 1, comprising at least one heating element and means for positioning the at least one heating element, means for positioning the base body, means for positioning the component, means for detecting the geometry data and position data of a body, and a control unit, whereby the means for positioning the at least one heating element, the means for positioning the base body, and the means for positioning the component work together, controlled by the control unit, in such a manner that a uniform distance between the at least one heating element and the joining surface of the base body can be achieved over the entire joining surface, on the basis of the geometry data and position data.

8. Device according to claim 7, wherein the means for positioning the base body and the means for positioning the component work together, controlled by the control unit, in such a manner that when base body and component are joined together, a uniform contact pressure can be achieved over the joining surfaces, on the basis of the geometry data and position data.

9. Device according to claim 7, wherein at least one means for positioning a heating element is a multi-axis robot.

10. Device according to claim 7, wherein the means for detecting geometry data and position data is a laser-supported 3D scanner.

11. Device according to claim 7, wherein in addition, means for processing the base body are provided, which can be controlled by the control unit on the basis of the geometry data and position data detected.

12. Device according to claim 7, wherein heating element and means for detecting geometry data and position data are combined in an effector unit.

* * * * *